ns828B1

(12) United States Patent
Wolf et al.

(10) Patent No.: US 8,515,828 B1
(45) Date of Patent: Aug. 20, 2013

(54) PROVIDING PRODUCT RECOMMENDATIONS THROUGH KEYWORD EXTRACTION FROM NEGATIVE REVIEWS

(75) Inventors: Noam Wolf, Jersey City, NJ (US); Zutao Zhu, Elmhurst, NY (US); Nemo Semret, New York, NY (US); Jacob Baskin, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/483,037

(22) Filed: May 29, 2012

(51) Int. Cl.
*G06Q 30/06* (2012.01)

(52) U.S. Cl.
USPC .......................................... 705/26.7; 705/26.1

(58) Field of Classification Search
USPC ................................. 705/26.1, 26.7
See application file for complete search history.

(56) References Cited

U.S. PATENT DOCUMENTS

| | | | |
|---|---|---|---|
| 7,599,926 B2 * | 10/2009 | Takahashi et al. ................ | 1/1 |
| 7,996,210 B2 * | 8/2011 | Godbole et al. ................ | 704/9 |
| 8,010,539 B2 * | 8/2011 | Blair-Goldensohn et al. ............... | 707/750 |
| 2005/0091038 A1 * | 4/2005 | Yi et al. ........................ | 704/10 |
| 2005/0125216 A1 * | 6/2005 | Chitrapura et al. ............... | 704/1 |
| 2006/0069589 A1 * | 3/2006 | Nigam et al. ..................... | 705/1 |
| 2006/0112134 A1 * | 5/2006 | Tsuboi et al. ................. | 707/102 |
| 2006/0129446 A1 * | 6/2006 | Ruhl et al. ..................... | 705/10 |
| 2006/0200342 A1 * | 9/2006 | Corston-Oliver et al. ...... | 704/10 |
| 2007/0198530 A1 * | 8/2007 | Takahashi et al. ............. | 707/10 |
| 2008/0270116 A1 * | 10/2008 | Godbole et al. .................. | 704/9 |
| 2009/0048823 A1 * | 2/2009 | Liu et al. .......................... | 704/9 |
| 2009/0193011 A1 * | 7/2009 | Blair-Goldensohn et al. .... | 707/5 |

OTHER PUBLICATIONS

Khoo, C. S., Nourbakhsh, A., & Na, J. (2012), "Sentiment analysis of online news text: A case study of appraisal theory," Online Information Review, 36(6), 858-878. doi:http://dx.doi.org/10.1108/14684521211287936.*

* cited by examiner

*Primary Examiner* — Amee A Shah
(74) *Attorney, Agent, or Firm* — Johnson, Marcou & Isaacs, LLC

(57) ABSTRACT

A product recommendation system and method identify product characteristics from customer reviews using a semantic analysis of the product review text. The semantic analysis identifies negative sentiment keywords associated with one or more product characteristics in the customer review and assigns each negative sentiment keyword a value. The value of each identified negative sentiment keywords is then used to calculate a score for the product characteristic to which the negative sentiment keyword is correlated. A product recommendation report comprising the identified products, their product characteristics, a list of scored product reviews, or a combination thereof is then presented to the end user.

26 Claims, 4 Drawing Sheets

US 8,515,828 B1

PROVIDING PRODUCT RECOMMENDATIONS THROUGH KEYWORD EXTRACTION FROM NEGATIVE REVIEWS

TECHNICAL FIELD

The present disclosure relates generally to a system for providing product or service provider recommendations to a user based on a user's search criteria. More particularly, the present invention utilizes asymmetries between positive and negative consumer-generated reviews to identify information on product characteristics of interest to a user.

BACKGROUND

Consumers want to find products and services, such as books, movies, restaurants, hotels, and online merchants, that are highly regarded and that fit their particular needs. A growing body of user-generated product reviews exists which include information useful to a consumer when making their own purchase decisions. However, the body of product reviews can be immense and difficult to navigate, making the identification of pertinent information difficult.

Many attempts have been undertaken to utilize user-generated reviews to provide recommendations to consumers. However, these attempts have been less than successful for a number of reasons. Product and service providers can influence the recommendations by providing positive reviews of their own, or incentivizing customers to do so. Product reviews often can suffer from selection bias induced by the fact that consumers are more likely to leave reviews when they have an extremely positive or extremely negative experience. In addition, it can be difficult to account for personal differences. One individual may attach varying levels of importance to different aspects of a product or service, which means what may appeal to one person may not appeal, or may be less important to another individual. The most common approach to personalized recommendations often is referred to as "collaborative filtering," where reviews from people with similar expressed preferences are given more weight. However, it is difficult to provide good score-based feedback on products or services with a low number of product reviews.

Accordingly, a need in the art exists for systems and methods that can aggregate and present such product information to the consumer in an informative and readily accessible manner.

SUMMARY

In certain exemplary aspects, a method for providing product recommendations based on user-generated product reviews comprises receiving a product recommendation request defining a product review search criteria, identifying product reviews matching the product review search criteria to generate a review analysis set, identifying negative sentiment key phrases in the review analysis set, calculating a weight for each identified negative sentiment key phrased based on the negative sentiment key phrase's relative frequency, correlating the negative sentiment key phrase to one or more product characteristics, calculating a score for each product characteristic based on the weights of the negative sentiment key phrase or phrases correlated to the product characteristic, generating, for each product reviewed in the customer review set, a product recommendation report comprising a list of each product reviewed and, for each product, a list of scored product characteristics, and communicating the product recommendation report to the user.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

The methods and systems described herein enable a user to filter a large body of product reviews to obtain product recommendations containing information on product characteristics unique to a given product and customized to the user's particular interest. The user may then read the identified reviews, utilize the product information in the identified reviews to categorize a product according to certain product characteristics important to the user, or filter out certain products from a list of viable purchase options.

As used throughout this specification "product" should be interpreted to include tangible and intangible products, as well as services.

The methods and systems of the present invention utilize one or more semantic analysis models to filter out extraneous and redundant information and identify negative sentiment keywords that relate to a specific characteristic of a product. The language analysis model is derived using only negative reviews, but once derived may be applied to both positive and negatively rated reviews. For example, a purely exemplary review may state the following. "I went to A Restaurant last evening and it was horrible! We waited over an hour to be seated, and our waiter was so rude to us! I'm never going back there!" The language analysis would focus on terms such as "waited for over an hour," "waited," and "rude" since they refer to specific aspects of the restaurant that characterized the reviewer's experience, rather than "never coming back" or "horrible" since they are redundant to the negative sentiment already indicated by the review's negative rating, or "A Restaurant" or "last evening" which don't provide generally applicable information relevant to characterizing the service at the restaurant. The negative sentiment keywords are then correlated to one or more product characteristics. In the above example, the terms "rude" and "waiter" would be correlated to the product characteristics indicative of poor service. In certain exemplary embodiments, a weight may be assigned to each negative sentiment keyword and used to calculate a score for each product characteristic correlated to that negative sentiment key word. The results are then displayed to the user. The results may be used to list product characteristics identified from the reviews by problem category rather than by a score, or filter products based on the nature of their review. For example, results of the product review search could be used to filter out products identified as having bad service.

The inventive functionality of the invention will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

Figure 1:
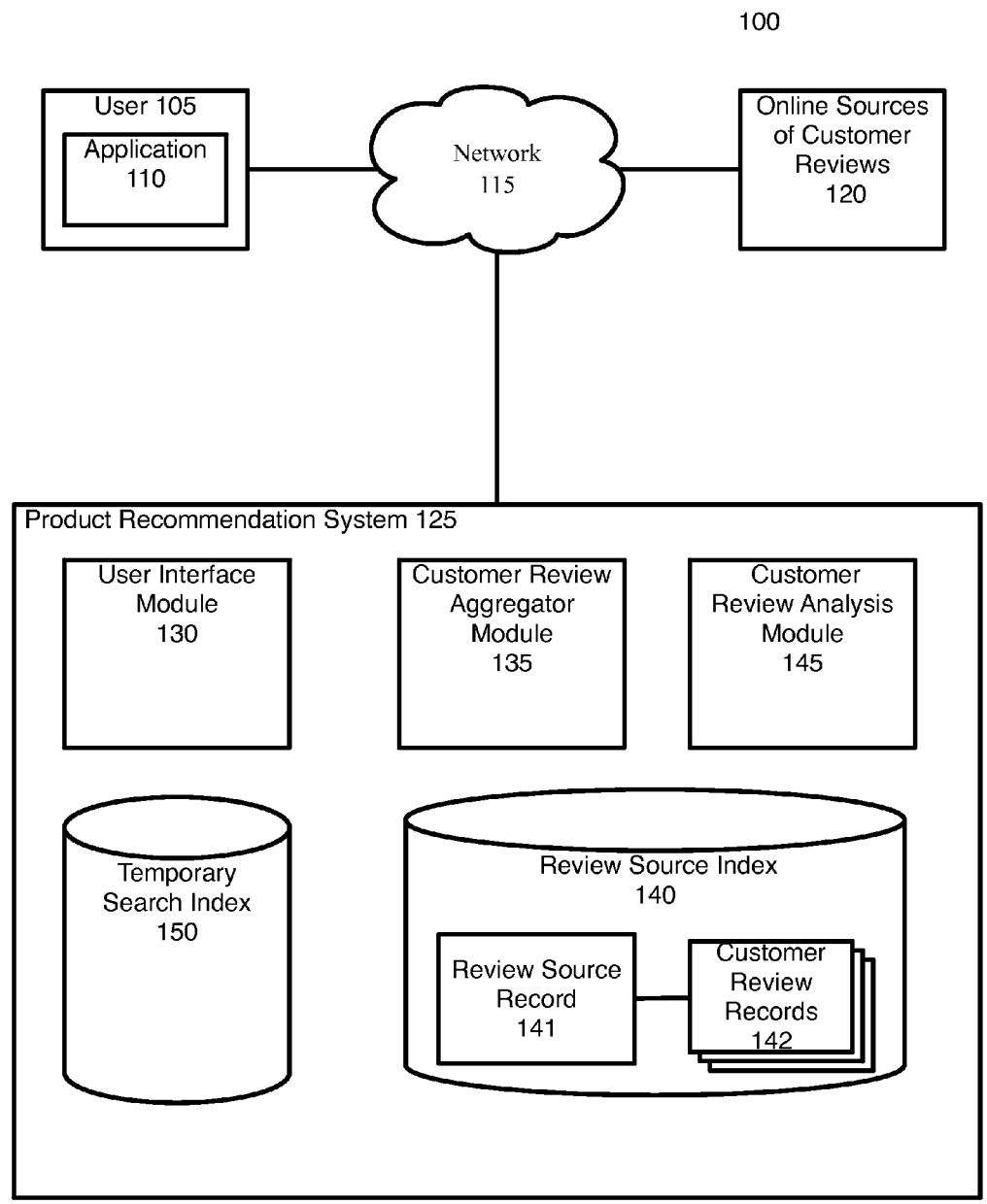
FIG. 1 is a block diagram depicting a product recommendation system according to an exemplary embodiment.

FIG. 1 is a block diagram depicting a product recommendation system 100 according to an exemplary embodiment. As depicted in FIG. 1, the system 100 includes network devices 105, 120, and 125 that are configured to communicate with one another via one or more networks 115.

Each network 115 includes a wired or wireless telecommunication means by which network devices (including devices 105, 120, 125) can exchange data. For example, each network 115 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 120, 125 includes a device having a communication module capable of transmitting and receiving data over the network 115. For example, each network device 105, 120, 125 can include a server, desktop computer, laptop computer, tablet computer, smart phone, handheld computer, personal digital assistant ("PDA"), or any other wired or wireless, processor-driven device. In the exemplary embodiment depicted in FIG. 1, the network devices 105, 120, 125 are operated by end-users or consumers, publishers of product reviews, and a product recommendation system operator, respectively.

The end user network devices 105 each include an application module 110. The application module may be a browser application such as Microsoft Internet Explorer, Firefox, Netscape, Google Chrome, Safari, or another suitable application for interacting with web page files maintained by the product review search system 125 and/or other network devices. The web page files can include text, graphic, images, sound, video, and other multimedia or data files that can be transmitted via the network 115. For example, the web page files can include one or more files in the Hypertext Markup Language ("HTML"). The browser application module 110 can receive web page files from the product recommendation system 125 and can display the web page files to end users operating the end user network devices 105. The application module 110 may also comprise a mobile application that resides on a mobile device of the user 105.

In one exemplary embodiment, the product review search system 125 comprises a user interface module 130, a product review aggregator module 135, a product review analysis module 145, and optionally a review index 140 containing product review source records 141 and product review records 142, and a temporary search index 150. The product review search system 125 communicates with end-user devices 105 and the servers of online sources of product reviews 120 via a network 115. The user interface module 130 generates a user interface that allows a user to enter through an application module 110 the product search information of interest, as well as view the product recommendations or product reviews returned by the product review search system 125. The product review aggregator module 135 receives product search information from the user interface module 130 and identifies product reviews matching the search criteria. In one exemplary embodiment, the product review aggregator 135 identifies product reviews in a review source index 140. The review source index 140 can contain an index that is updated at a determined frequency to contain a list of all available online sources of product reviews 120. Alternatively the review source index 140 may store reviews as identified in previous product searches. In another exemplary embodiment, the product review aggregator module 135 searches or polls online sources of user-generated product reviews 120 to identify reviews matching the product search request. In yet another exemplary embodiment, the review aggregator module 135 may both search a review index 140 as well as search or poll online sources of user-generated product reviews 120. The product review aggregator module 135 communicates identified product reviews to the product review analysis module 145. The product review analysis module 145 applies a semantic analysis model to identify negative sentiment keywords. The negative sentiment keywords are associated with certain product characteristics which can be used to provide recommendations based on the identified product characteristics, annotate products, filter products, or a combination thereof. The product review analysis module 145 communicates the results to the user interface module 130 for display to the user.

The product annotation system 125 is described in more detail hereinafter with reference to the methods depicted in FIGS. 2-5.

System Process

Figure 2:
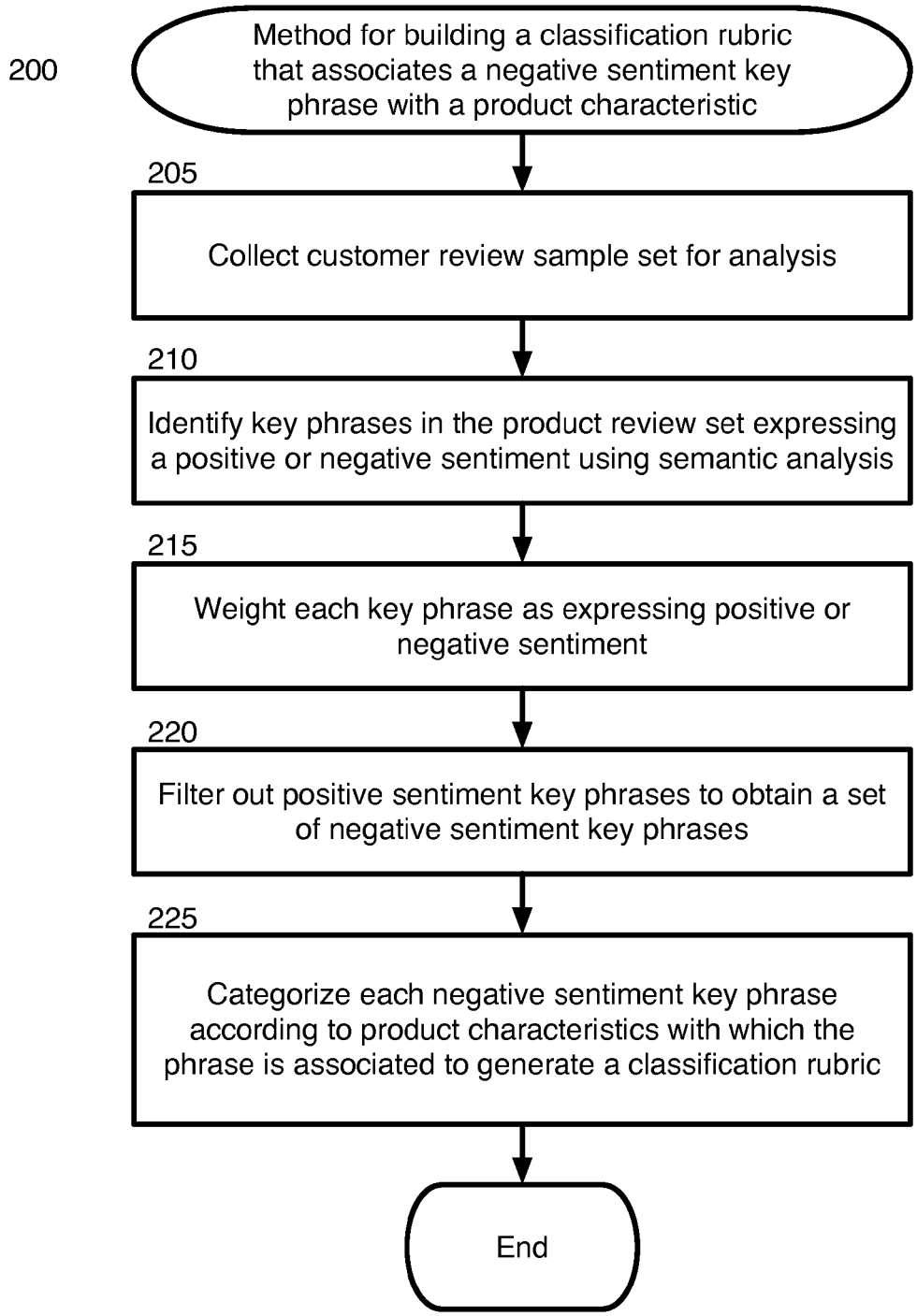
FIG. 2 is a block flow diagram depicting a method for building a classification rubric according to an exemplary embodiment.

FIG. 2 is a block flow diagram depicting a method 200 for constructing a product recommendation classification rubric based on negative sentiment key phrases. The method 200 is described with reference to the components in FIG. 1.

Method 200 begins with block 205 where the product review aggregator module 135 collects a set of user-generated product review samples for semantic analysis by, for example, crawling various web sites where user-generated product reviews are published. Alternatively, the review sample set may be uploaded directly to the product recommendation system 125 by an operator of the system. The size and scope of the review sample set may vary and will depend on such factors as the type of products the product recommendation system 125 is designed to provide product recommendations on and the type of semantic analysis to be performed on the review sample set. The review sample set may be further filtered, for example, to include product reviews scored above a pre-determined score or rating cut-off. Alternatively, product reviews may be filtered by user. For example, user-generated product reviews may be selected based on the frequency with which a given user provides negative reviews. Customer reviews authored by a user who more frequently gives negative reviews can be excluded, and negatively scored reviews from a user that more frequently gives positive scored reviews included. While not bound by the following theory, a reviewer who infrequently gives a negative product review may be more likely to do so only when real issues exists with one or more aspects of a product, whereas an individual who frequently issues negative reviews may reflect a general predisposition to give negative reviews regardless of the existence of any substantive issues. Such a criteria may further reduce gaming of the system, or the planting of unsubstantiated negative reviews to influence the outcomes of the product recommendation system 125 analysis.

At block 210, the product review analysis module 145 applies a semantic analysis algorithm to the text of each product review in the review set to identify those words that are indicative of a user's preferences or opinions when assessing their experience with a product. These words or combinations of words are classified as "sentiment key phrases" and can be identified, for example, by a language analysis algorithm. The language analysis algorithm may be a supervised or unsupervised machine learning algorithm. Exemplary supervised learning algorithms include, but are not limited to, support vector machines and naïve bayes classifiers. Exemplary unsupervised learning algorithms include, but are not limited to, bootstrapping and neural networks. In addition to identifying key phrases, the language analysis module may identify one or more product classes or product characteristics with which the key phrase is associated and as discussed further with reference to block 225 below.

At block 215, the key phrases are identified as expressing a positive sentiment or a negative sentiment. In certain exemplary embodiments, the classification is done using automatic sentiment analysis. This classification may be a straight binary classification as either positive or negative. For example, the phrase "I like" would be classified as positive and the phrase "I hate" would be classified as negative. Alternatively, the key phrases could be scored on a continuum between strictly positive and strictly negative. For example, the score could range from +1 for strictly positive to −1 for strictly negative. The phrase "I dislike" might receive a score of −0.2 while the phrase "I hate" a score of −1.0.

At block 220, the product review analysis module 145 filters out key phrases defined above as positive sentiment key phrases to generate a negative sentiment key phrase set.

At block 225, each key phrase is then categorized into one or more product characteristic groups with which the phrase is most closely associated to generate a classification rubric. In one exemplary embodiment, this classification may be manually performed by an operator of the product recommendation system 125. Alternatively, the source or context of the key phrase may be noted during the semantic analysis performed in block 210, and this information used to automatically define and classify key phrases based on the results of the semantic analysis. In another exemplary embodiment, a combination of manual classification and automatic classification may be employed to define the product characteristic groups and characterize each key phrase accordingly.

Figure 3:
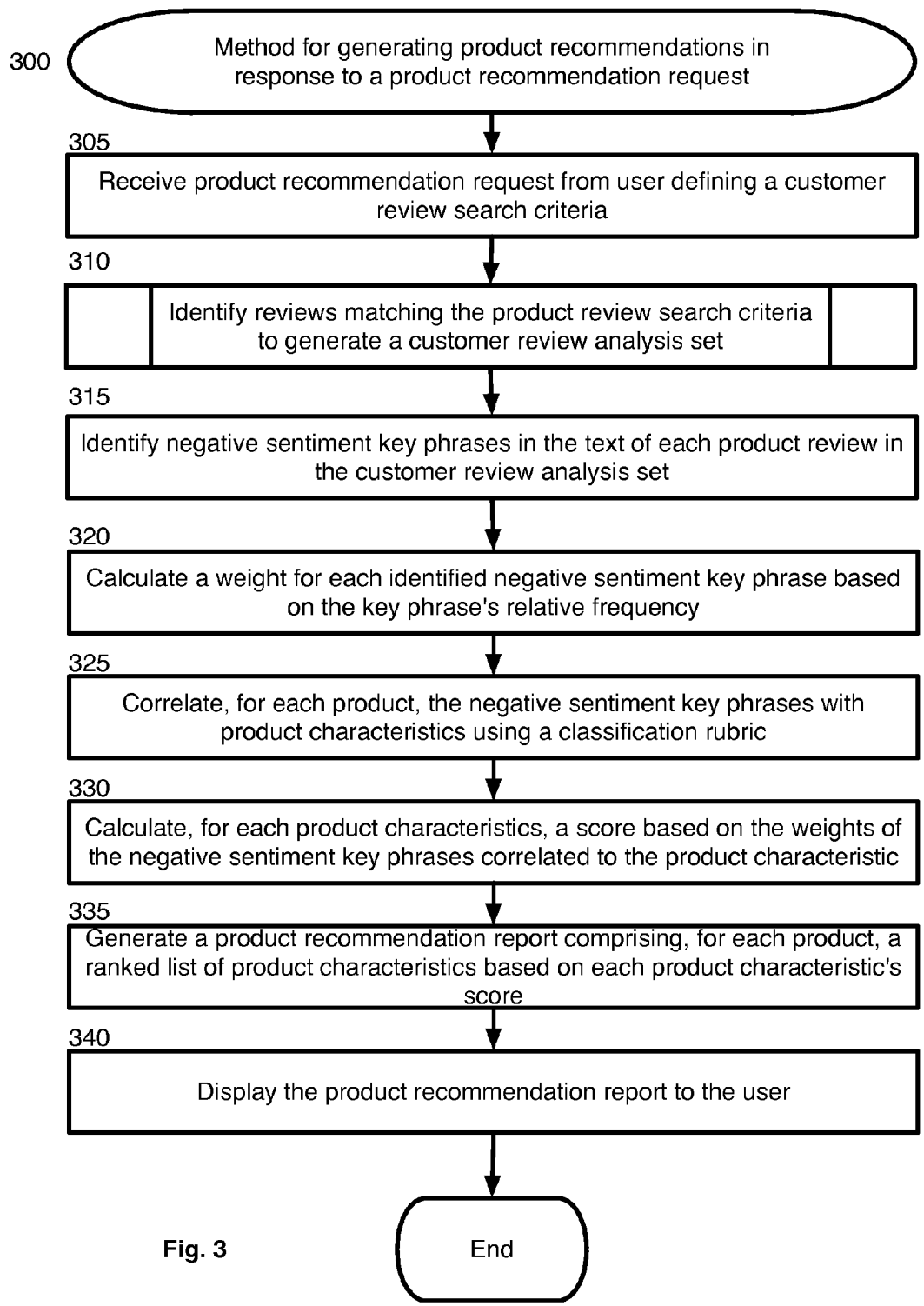
FIG. 3 is a block flow diagram depicting a method for generating product recommendations in response to a product recommendation request according to an exemplary embodiment.

FIG. 3 is a block flow diagram depicting a method 300 for generating product recommendations in response to a product recommendation request, wherein the product recommendations are based on an analysis of negative sentiment key phrases identified within a set of relevant customer reviews. A relevant customer review is a review describing a user's experience with a product or products matching the search parameters of the product recommendation request. The method 300 is described with reference to the components illustrated in FIG. 1.

Method 300 begins with block 305, in which the user interface module 135 receives a request for product information from a user defining a customer review search criteria. The user interface generated by the user interface module 130 may provide a search line for a user to enter a specific product or product category on which they wish to receive product recommendations. A "product category" as used herein refers to a related class of products, such as Italian restaurants or running shoes. The user interface may further comprise additional search filters the user can select to further customize their search. Exemplary search filters include, but are not limited to, a geographical search feature for limiting results to information pertaining to products available within a particular geographic area, or a price range filter that limits results to information pertaining to products within a defined price range. Filter options may also include common product characteristics of interest to consumers that a user can select to further define the type of product information they would like to receive. The user interface may also provide the user with the ability to limit the results to negative reviews, or product reviews that were scored below a certain score level. A cut-off value for a negative customer review can be defined by the operator of the product review search system 125, or user defined. In certain exemplary embodiments the product recommendation system 125 may further comprise a review score matrix for converting different review rating systems used by different online sources of user-generated product reviews 120 into a standardized rating for purposes of a determining a cut-off value. For example, a score matrix can be defined that converts a scoring system based on a number of "stars" into a numerical score, or vice versa. The product search request and any user or system applied search filters are used to generate a product review search criteria. The user interface module 130 communicates the customer review search criteria to the customer review aggregator module 135 and the method proceeds to block 310.

At block 310, the product review aggregator module 135 receives the review search criteria from the user interface module 135 and uses the review search criteria to identify user-generated product reviews for further analysis by the product review analysis module 145. Block 310 will be described in further detail hereinafter with reference to FIG. 4.

Figure 4:
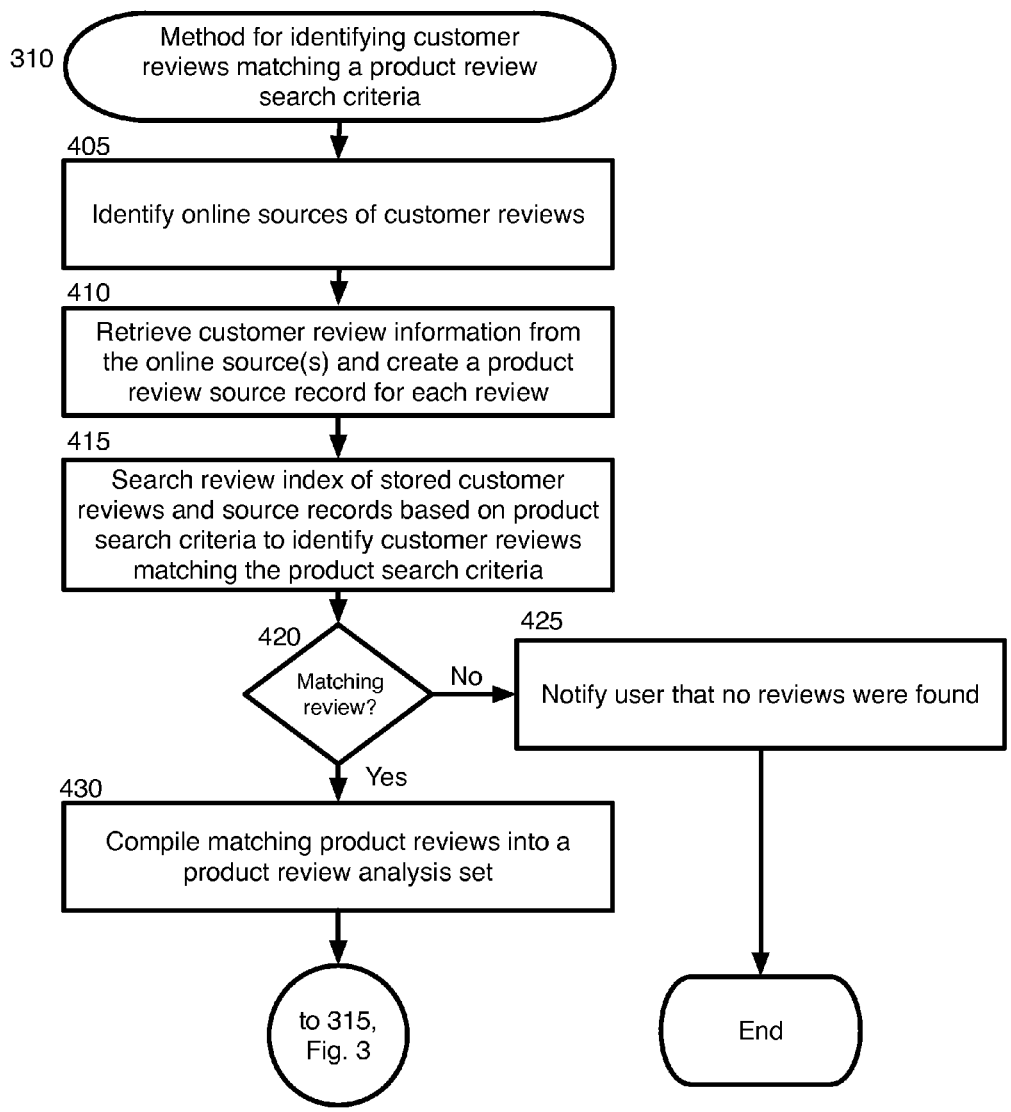
FIG. 4 is a block flow diagram depicting a method for identifying product reviews matching a product review search criteria according to an exemplary embodiment.

FIG. 4 is a block flow diagram depicting a method for identifying reviews matching a product review search criteria according to an exemplary embodiment, as referenced in block 310 of FIG. 3. Thus, FIG. 3 describes a process 310 by which product reviews matching the review search criteria are identified and indexed for utilization by the product recommendation system 125.

At block 405 the product review aggregator module 135 identifies online sources of user-generated product reviews. Online sources may include product review specific websites that user-generated product reviews on a particular product, such as hotels or restaurants. Further, an online source may include a commercial website that allows users to comment or rate the products they purchase on the site, such as electronics, music, and books.

At block 410, the product review aggregator module 135 retrieves product review information from the online source and creates a review source record 141 in a review source index 140. The product review information may include the type(s) of product reviewed at the online source, the review rating system used, and a URL or other locator where the product reviews can be accessed. To make product reviews accessible for subsequent product recommendation searches, the review aggregator module 135 may download and index the customer reviews as product review records 142 in the review source index 140 and associate each product review record 142 with the product review's corresponding product review source record 141. The product reviews may be stored in a single index or multiple indices. In certain exemplary embodiments, the product reviews can be stored in separate indices based on product or product type. Metadata may also be stored for each product review record 142 and may include a user identifier for the author of the review, date of review, and product or product category reviewed.

Alternatively, the product review aggregator module 135, may store only a URL or other locator of where the product reviews can be accessed with the review sourced record 141. The product review information stored in the online review source record 141 can be used to identify user-generate product review sources 120 that contain product reviews related to a given product review search criteria. The URL may be static or dynamic.

In certain exemplary embodiments, blocks 405 to 410 are completed upon initiation of the product recommendation system 125 and prior to any user-initiated product search request. In certain exemplary embodiments, blocks 405 to 410 are repeated at regular intervals to update the review source records 141 and product review records 142 contained in the review source index. An operator of the product recommendation system 125 may set or modify the regular update interval.

At block 415, the product review aggregator module 135 identifies review source records 141, product review records 142 in the review source index 140, or both that match the product review search criteria. For online review source records 141 that contain locally stored product review records 142, the product review aggregator module 145 searches the product review records 142 and indentifies product reviews matching the product review search criteria. The set of all product reviews records 142 searched may be initially filtered by the product information stored in the review source record 141 or by metadata associated with each customer review record 142. For example, if the product review search criteria is limited to restaurants in a particular geographic location, the product review aggregator module 135 will only search those product review records 142 associated with review source records 141 containing matching product information based on geographic location.

For online review source records 141 containing a static URL, the product review aggregator module 135 identifies the review source record 141 containing product information related to the product review search criteria. The review aggregator module 135 then retrieves the product reviews located at the corresponding static URL. The product review aggregator module 135 may store the retrieved product reviews in a in a temporary search index 150 or other temporary data storage construct for further analysis.

For a dynamic URL, the product review aggregator module 135 posts the product review search criteria to a API associated with the dynamic URL. The API then processes the product review search criteria to determine if matching product reviews are located at the online source. The API then communicates any matching product reviews to the product review aggregator module 135. The product review aggregator module 135 may also store product reviews retrieved from dynamic URLs in the temporary review index 150 or other temporary data storage construct. For dynamic URLs, the product review aggregator module 135 may utilize a persistent HTTP connection such as a HTTP server push, a pushlet, long polling, or HTML5 websockets to achieve dynamic retrieval of the customer reviews without delaying retrieval and analysis of product reviews obtained from static URLs and the review source index 140.

At block 420, the product review aggregator module 135 determines if product reviews matching the review search criteria are identified. If no matching product reviews are identified the method proceeds to block 425.

At block 425, the product review aggregator module 135 communicates the lack of reviews to the user interface module 130. The user interface module 130 generates a notification indicting no reviews were identified and communicates the notification to the user. The method 400 then terminates.

Returning to block 420, if matching reviews are identified by the product review aggregator module 135, the method proceeds to block 330.

At block 430, the product review aggregator module 135 compiles all product reviews matching the product review search criteria into a product review analysis set for further analysis by the product review analyzer module 145. In certain exemplary embodiments, matching product reviews in the review analysis set are stored in the review source index 140 to allow commonly searched product reviews to be more readily retrieved in subsequent searches. The method then proceeds to block 315 of FIG. 3.

Returning to FIG. 3, at block 315, the product review analysis module 145 receives the reviews compiled by the product review aggregator 135 to form a review analysis set. The product review analyzer module 145 searches and identifies in each product review matching negative sentiment keywords defined in the classification rubric referenced in block 225 of FIG. 2. The negative sentiment keywords in the classification rubric may be selected by filtering the negative sentiment keywords from the positive sentiment keywords using a cutoff for the weighted values assigned to each keyword as referenced at block 220 of FIG. 2. The negative sentiment keywords can be identified by searching the customer review text using a natural language processing algorithm.

At block 320, the product review analysis module 145 calculates a weight for each identified negative sentiment key phrase based on the key phrase's relative frequency. The relative frequency may be calculated using the raw frequency or the negative-log frequency. In one exemplary embodiment, the relative frequency of a negative sentiment keyword is based on the number of times the keyword appears in a given product review compared to the number of times the negative sentiment keyword appears in other reviews of the same product in the review analysis set. In another exemplary embodiment, the relative frequency is determined in relation to how frequently the negative sentiment keyword is used in product reviews of all products within that same product class, not just the product reviews in the product review set. For example, the use of "term X" in a product review of generic "restaurant A" is compared to how frequently the term is used in product reviews of all other restaurants, or restaurants of the same class, such as French restaurants. In yet another exemplary embodiment, the relative frequency is determined in relation to how frequently a negative sentiment keyword appears in a product review and all other product reviews available to the product recommendation system 125. In certain exemplary embodiments, the product review analyzer module 145 weights each identified negative sentiment keyword inversely based on the term's relative frequency. Thus, negative sentiment key phrases that occur less frequently are therefore given higher weight as such terms are more likely to reflect a product characteristic that is unique for that product. In certain exemplary embodiments, the weight for the key word may further include the weight assigned to the keyword at block 220 of FIG. 2.

At block 325, the product review analysis module 145 assigns, for each product, the product characteristics to which the identified negative sentiment key phrases are assigned in the classification rubric. For example, if the product review criteria defined in block 305 of FIG. 3 results in a review analysis set that contains product reviews for five different products, the negative sentiment key phrases identified in each individual product's corresponding product reviews would be used to assign product characteristics to that product. Accordingly, after a negative sentiment key phrase is identified in a customer review of a given product, the classification rubric defines which product characteristics are assigned to that product.

At block 330, the product review analyzer module 145 scores each product characteristic based on the composite value of the weights associated with the negative sentiment key phrase's correlated to that product characteristic. For example, one product review of a product may use term "A" associated with a given product characteristic and which carries a weight of X and another product review may use term "B" associated with the same product characteristic and which carries a weight of Y. The score for the product characteristic would be the composite value of weights X and Y. Accordingly each product characteristic can be ranked according to the weight of the underlying key phrases associated with that product characteristic. In certain exemplary embodiments, a link to the source product review for each negative sentiment key phrase is maintained so that a link back to the source product reviews can be presented to the user as described in further in reference to block 340 of FIG. 3

At block 335, the product review analysis module 145 generates a product information report comprising, for each product, an identity of the product and a ranked list of product characteristics based on the individual product characteristic scores. Accordingly, for each individual product identified, the product information report will list the product characteristics identified as characterizing that product. For example, where the negative sentiment keywords "rude" and "long wait" are identified in a customer review of a restaurant and associated by the classification rubric with poor service, the product information report will identify the reviewed restaurant has having the product characteristic of poor service. Each product characteristic will carry with it a score value showing how indicative the product characteristic is of that particular product. The product review analysis module 145 then communicates the product information report to the user interface module 130, and the method proceeds to block 340. The product characteristic score may be determined by the weights associated with each negative sentiment keyword or combined with other ratings.

At block 340, the user interface module 130 receives the product information report from the review analyzer module 145. The user interface module 130 then displays a product information report to the user according to user or system defined preferences. For example, the user interface module 130 may present the product characteristics that were identified for each product based on the review search criteria. The identified negative sentiment keywords, or snippets showing the negative sentiment keyword in the immediate context of where it appears in the product review, may be displayed along with the product characteristics. Alternatively, a link to the complete source product review(s) for each product characteristic may be presented to the user.

The user may further filter the product information based on eliminating those product characteristics not of interest. These user preferences may be defined when initiating the product information search, or selected when viewing the product information report. In one exemplary embodiment, the product information report can include only those products that did not contain product characteristics identified by the semantic analysis. For example, the product information report could return only those products that did not have product reviews indicating bad service. In certain exemplary embodiments, the user may select to see the full product reviews identified in the semantic analysis. The user interface module 130 then loads those product reviews ranked according to the score assigned to each product review by the customer review analysis module 145.

General

Users can, in appropriate circumstances, limit or otherwise affect the operation of the features disclosed in the specification. For example, users can be given an initial opportunity to opt-in or opt-out of the collection or use of certain data or the activation of certain features. In addition, a user can change the manner in which the features are employed, including for situations in which a user can have concerns regarding his privacy. Instructions can be provided to users to notify the users regarding policies about the use of information, including personally identifiable information and receipt information, and manners in which the users can affect such use of information.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments of the invention have been described above in detail, the description is merely for purposes of illustration. Various modifications of, and equivalent blocks and components corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for providing product recommendations based on identification of negative sentiment key phrases in customer reviews, the method comprising:
receiving, by a computer, a request for product information defining at least a product or product category;
identifying, by the computer, product reviews matching the product or product category to generate a review analysis set;
identifying, by the computer, negative sentiment key phrases in each review of the review analysis set;
calculating, by the computer, a weight for each identified negative sentiment key phrase by determining a relative frequency of the identified negative sentiment key phrase in the customer reviews of the review analysis set and calculating an inverse of the relative frequency;
correlating, by the computer, the negative sentiment key phrases with product characteristics using a classification rubric, wherein the classification rubric defines which negative sentiment key phrases are associated with a product characteristic;
calculating, by the computer, for each product characteristic, a score based on the weights of the negative sentiment key phrase or phrases correlated to the product characteristic;
generating, by the computer, an identity of each product reviewed in the review analysis set and, for each product, a summary of scored product characteristics; and
communicating, by the computer, at least a portion of the identities of each product reviewed in the review analysis set and the corresponding summary of scored product characteristics.

2. The method of claim 1, wherein the classification rubric is derived by conducting a semantic analysis of a product review sample set to identify sentiment key phrases and assigning each sentiment key phrase to a product characteristic.

3. The method of claim 2, wherein the semantic analysis is conducted using a supervised or unsupervised machine learning algorithm.

4. The method of claim 3, wherein the semantic analysis further identifies product characteristic categories for use in mapping the negative sentiment key words to a product characteristic in the classification rubric.

5. The method of claim 2, wherein the sentiment key phrases are classified as negative or positive sentiment key phrases.

6. The method of claim 5, wherein the positive sentiment key phrases are filtered out prior to assigning the sentiment key phrases to a product characteristic.

7. The method of claim 1, wherein the relative frequency of a negative sentiment key phrase is calculated by determining how frequently the negative sentiment key phrase is used in customer reviews of all products of the same product class.

8. The method of claim 1, wherein the relative frequency of a negative sentiment key phrase is calculated by determining how frequently the negative sentiment key phrase is used in all customer reviews regardless of product class.

9. The method of claim 1, wherein the review search criteria further specify a desired product characteristic.

10. The method of claim 9, wherein the desired product characteristic is good service, quality, or affordability.

11. A computer program product, comprising:
a non-transitory computer-readable storage device having computer-readable program code embodied therein that when executed by a computer cause the computer to perform a method for providing product information based on user-generated product reviews, the computer-readable program code comprising:
computer-readable program code for receiving a request for product information defining at least a product or product category;
computer-readable program code for identifying product reviews matching the review search criteria to generate a review analysis set;
computer-readable program code for identifying negative sentiment key phrases in each review of the review analysis set;
computer-readable program code for calculating a weight for each identified negative sentiment key phrase by determining a frequency of the negative sentiment key phrase in the review analysis set and calculating an inverse of the frequency;
computer-readable program code for correlating the negative sentiment key phrases with product characteristics using a classification rubric, wherein the classification rubric defines which negative sentiment key phrases are associated with a product characteristic of a product class;
computer-readable program code for calculating for each product characteristic a score based on the weights of the negative sentiment key phrase or phrases correlated to the product characteristic;
computer-readable program code for generating an identity of each product reviewed in the review analysis set and, for each product, a summary of scored product characteristics; and
computer-readable program code for communicating at least a portion of the identities of each product reviewed in the review analysis set and the corresponding summary of scored product characteristics.

12. The computer program product of claim 11, wherein the classification rubric is derived by conducting a semantic analysis of a product review sample set to identify sentiment key phrases and assigning each sentiment key phrase to a product characteristic.

13. The computer program product of claim 12, wherein the semantic analysis is conducted using a supervised or unsupervised machine learning algorithm.

14. The computer program product of claim 13, wherein the semantic analysis further identifies product characteristic categories for use in mapping the negative sentiment key words to a product characteristic in the classification rubric.

15. The computer program product of claim 12, wherein the sentiment key phrases are classified as negative or positive sentiment key phrases.

16. The computer program product of claim 13, wherein the positive sentiment key phrases are filtered out prior to assigning the sentiment key phrases to a product characteristic.

17. The computer program product of claim 11, wherein the relative frequency of the negative sentiment key phrase is calculated by determining how frequently the negative sentiment key phrase is used in customer reviews of all products of the same product class.

18. The computer program product of claim 11, wherein the relative frequency of a negative sentiment key phrase is calculated by determining how frequently the negative sentiment key phrase is used in all customer reviews regardless of product class.

19. A system for providing product information based on identification of negative sentiment key phrases in customer reviews, the system comprising:
 a storage device;
 a network communication device; and
 a processor communicatively coupled to the storage device and the network communication device, wherein the processor executes application code instructions that are stored in the storage device and that cause the system to:
  receive a request for product information defining at least a product or product category;
  identify product reviews matching the product or product category to generate a review analysis set;
  identify negative sentiment key phrases in each review of the review analysis set;
  calculate a weight for each identified negative sentiment key phrase by determining a frequency for the identified negative sentiment key phrase in the review analysis set and calculating an inverse of the frequency;
  correlate the negative sentiment key phrases with product characteristics using a classification rubric, wherein the classification rubric defines which product characteristics are associated with a negative sentiment key phrase; and
  calculate, for each product characteristic, a score based on the weights of the negative sentiment key phrases correlated to the product characteristic.

20. The system of claim 19, wherein the processor further executes application code instructions that are stored in the storage device and that cause the system to:
 generate an identity for each product review in the review analysis set and, for each product, a summary of scored product characteristics; and
 communicate at least a portion of the identities of each product reviewed in the review analysis set and the corresponding summary of scored product characteristics to a network device for display on the network device.

21. The system of claim 19, wherein the classification rubric is derived by conducting a semantic analysis of a product review sample set to identify sentiment key phrases and assigning each sentiment key phrase to a product characteristic.

22. The system of 19, wherein the semantic analysis further identifies product characteristic categories for use in mapping the negative sentiment key words to a product characteristic in the classification rubric.

23. The system of claim 19, wherein the classification rubric is derived by conducting a semantic analysis of a product review sample set to identify sentiment key phrases and assigning each sentiment key phrase to a product characteristic, and wherein the sentiment key phrases are classified as negative or positive sentiment key phrases.

24. The system of claim 19, wherein the positive sentiment key phrases are filtered out prior to assigning the sentiment key phrases to a product characteristic.

25. The system of claim 19, wherein the relative frequency of the negative sentiment key phrase is calculated by determining how frequently the negative sentiment key phrase is used in customer reviews of all products of the same product class.

26. The system of claim 19, wherein the relative frequency of a negative sentiment key phrase is calculated by determining how frequently the negative sentiment key phrase is used in all customer reviews regardless of product class.

\* \* \* \* \*